(No Model.)
S. SCOTT.
GARDEN IMPLEMENT.
No. 562,248. Patented June 16, 1896.
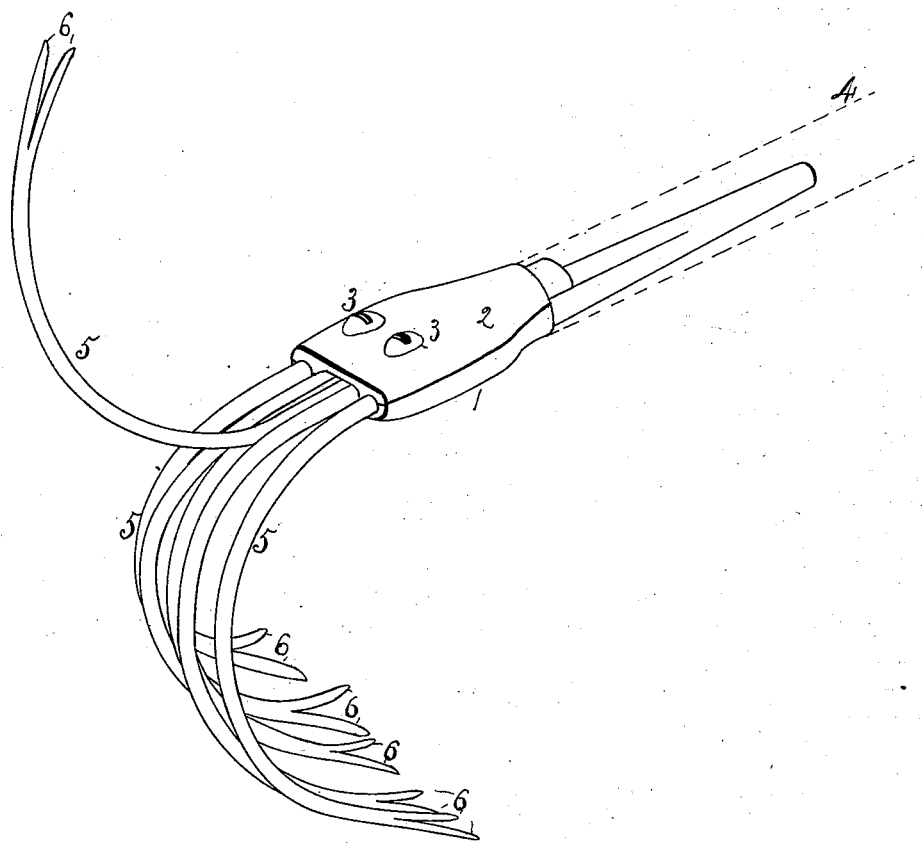
Witnesses:
N. M. Ward
E. Behel
Inventor:
Sylvester Scott
By A. O. Behel
Atty.

UNITED STATES PATENT OFFICE.

SYLVESTER SCOTT, OF ROCKFORD, ILLINOIS.

GARDEN IMPLEMENT.

SPECIFICATION forming part of Letters Patent No. 562,248, dated June 16, 1896.

Application filed August 31, 1895. Serial No. 561,174. (No model.)

*To all whom it may concern:*

Be it known that I, SYLVESTER SCOTT, a citizen of the United States, residing at Rockford, in the county of Winnebago and State of Illinois, have invented certain new and useful Improvements in Garden Implements, of which the following is a specification.

The object of this invention is to construct a tooth for weeding implements consisting of a shank having its end bifurcated and the inner faces sharpened.

The further object of this invention is the construction of a weeding implement having a series of bifurcated teeth connected to a handle forming one face and a single bifurcated tooth extending in the opposite direction.

In the accompanying drawing is shown a perspective view of a hoe embodying my improvements.

The hoe consists of a shank portion composed of the two sections 1 and 2, clamped together by screws 3. The meeting faces of these sections are longitudinally grooved. A handle 4 has a connection with the section 1. A series of teeth 5, each made from spring rod material bent in semicircular form having one end bifurcated, forming two prongs 6, the meeting faces of each prong being beveled or sharpened.

In the hoe shown in the drawing a series of these teeth are clamped in the shank and turned in the same direction, forming the main portion of the hoe, and a single tooth is clamped in the head and turned in the opposite direction.

In use, the series of teeth are employed to cultivate or weed between the rows, and where weeds cannot be reached or the ground loosened by the series of teeth it may be accomplished by the single tooth, and by forming the teeth with the prongs and sharpened on their meeting faces the ground can be stirred up and the weeds cut down, which is more readily accomplished by the cutting-faces extending obliquely to the line of force exerted by the operator. By holding the teeth in the shank portion they are easily removed and renewed and any number can be brought into use by turning them into the proper position.

I claim as my invention—

A tooth for a garden implement consisting of a cylindrical shank one end of the shank being flattened and bifurcated forming two prongs having rounded ends the meeting faces and rounded ends of the prongs being sharpened, the cylindrical shank being of smaller dimension than the width of the prongs, whereby the gathering of weeds on the shank is prevented.

SYLVESTER SCOTT.

Witnesses:
A. O. BEHEL,
E. BEHEL.